United States Patent [19]

Prevorsek et al.

[11] 4,137,218
[45] Jan. 30, 1979

[54] THERMOPLASTIC BENZOPHENONE POLYESTER

[75] Inventors: Dusan C. Prevorsek, Morristown; Leon Segal, Randolph, both of N.J.

[73] Assignee: Allied Chemical Corporation, Morris Township, Morris County, N.J.

[21] Appl. No.: 807,754

[22] Filed: Jun. 17, 1977

[51] Int. Cl.² .................. C08G 63/18; C08G 63/24
[52] U.S. Cl. ................................. 528/126; 528/125
[58] Field of Search ..................... 260/47 C, 40 R

[56] References Cited
U.S. PATENT DOCUMENTS

| | | | |
|---|---|---|---|
| 3,028,364 | 4/1962 | Conix et al. | 260/47 |
| 3,297,633 | 1/1967 | Hindersinn et al. | 260/47 |
| 3,317,464 | 5/1967 | Conix | 260/47 |

*Primary Examiner*—Lester L. Lee
*Attorney, Agent, or Firm*—Robert J. North; Robert A. Harman

[57] ABSTRACT

A thermoplastic benzophenone polyester consisting essentially of recurring units of the formula:

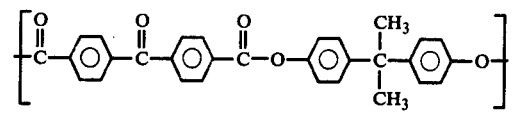

having an intrinsic viscosity of at least 0.85 deciliter/-gram as measured in 1:1 phenol/tetrachloroethane at 25° C, is useful for making shaped articles having high impact strength.

A process for preparing a thermoplastic polyester according to the above formula is also described which comprises the steps of (a) adding a solution of 4,4'-benzophenonedicarboxylic acid halide in an inert, water-immiscible organic solvent to a basic aqueous solution of a salt of 2,2-bis(4'-hydroxyphenyl)propane to form and precipitate the polyester during the addition and (b) recovering the precipitated polyester.

There is also provided a shaped article prepared from the polyester having an impact strength of at least about 2 ft.lb./in. of notch as measured by the Izod impact test, ASTM D-256-56.

18 Claims, No Drawings

THERMOPLASTIC BENZOPHENONE POLYESTER

BACKGROUND OF THE INVENTION

1. Field of the Invention

This invention relates to a thermoplastic benzophenone polyester, consisting essentially of the moieties of 2,2-bis(4'-hydroxyphenyl)propane and 4,4'-benzophenonedicarboxylic acid, a process for its preparation, and a shaped article prepared from the polyester having an impact strength of at least about 2 ft.lbs./in. of notch as measured by the Izod impact test, ASTM D-256-56.

2. Brief Discussion of the Prior Art

Thermoplastic aromatic polymers are well known in the art as being useful for making shaped and molded articles. Aromatic polyesters are especially desirable for this purpose since shaped articles derived therefrom tend to exhibit low moisture absorption, high heat deflection temperature, and high impact strength, all of which are desirable characteristics of such articles in many industrial applications. Examples of such applications are in the manufacture of industrial safety glass and safety housing units for plant machinery. Shaped articles made for these purposes should generally possess an impact strength of at least about 2 ft.lbs./in. of notch as measured by the Izod impact test, ASTM D-256-56.

A benzophenone polyester derived from 2,2-bis(4'-hydroxyphenyl)propane (bisphenol A) and 4,4'-benzophenonedicarboxylic acid chloride is known in the art and is disclosed in U.S. Pat. No. 3,028,364 (Conix, et al., 1962) and Industrial and Engineering Chemistry, Volume 51(2), pp 147–150 (1959) by Andre Conix. The above-identified patent discloses a general method for preparing fully aromatic polyesters by interfacial condensation polymerization, wherein an aromatic diacid chloride, dissolved in a chlorinated hydrocarbon solvent, is mixed with an aqueous solution of an alkali metal salt of a bisphenol, thereby forming an aromatic polyester which dissolves during its formation in the chlorinated hydrocarbon solvent. The above-identified journal article, by the same author, describes specifically an aromatic polyester made by this procedure from 4,4'-benzophenonedicarboxylic acid and bisphenol A having an intrinsic viscosity of 0.72 deciliters/gram.

These references also teach that, in order to obtain a high molecular weight polyester, as indicated by high intrinsic viscosity, the chlorinated hydrocarbon solvent should be a solvent for the polyester so that the polyester is obtained in solution form. While it is known that the impact strength of a polyester may sometimes increase with its molecular weight, this effect is not generally predictable.

Shaped articles made from the 4,4'-benzophenonedicarboxylic acid/bisphenol A polyester, produced by the prior art process, do not exhibit impact strengths of at least about 2 ft.lbs./in. of notch, as measured by ASTM D-256-56.

SUMMARY

According to this invention, there is provided a thermoplastic benzophenone polyester consisting essentially of recurring units of the formula:

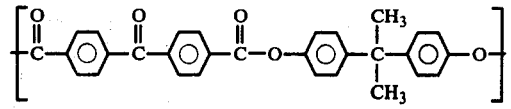

having an intrinsic viscosity of at least 0.85 deciliter/gram as measured in 1:1 phenol/tetrachloroethane at 25° C.

A process is also provided for preparing this thermoplastic benzophenone polyester which comprises the steps of (a) adding a solution of 4,4'-benzophenonedicarboxylic acid halide in an inert, water-immiscible organic solvent to a basic aqueous solution of a salt of 2,2-bis(4'-hydroxyphenyl)propane to form and precipitate the polyester during the addition, and (b) recovering the precipitated polyester.

There are also provided shaped articles made from the polyester having an impact strength of at least about 2 ft.lbs./in. of notch as measured by ASTM D-256-56.

DETAILED DESCRIPTION OF THE INVENTION AND PREFERRED EMBODIMENTS

The polyester of this invention consists essentially of recurring units of the above formula containing the moieties of 4,4'-benzophenonedicarboxylic acid and 2,2-(4'-hydroxyphenyl)-propane and possessing an intrinsic viscosity of at least 0.85 deciliter/gram as measured in 1:1 phenol/tetrachloroethane at 25° C. The polyester is thermoplastic and softens when heated above its glass transition temperature and returns to its original condition upon cooling, which allows the polyester to be heated and molded into a shaped article.

The number of recurring units of the above formula is large and is usually above 25 and preferably about 40 to 80 when the intrinsic viscosity of the polyester is at least 0.85 deciliters/gram as measured under the conditions described herein. An intrinsic viscosity of 1.07 for the polyester is equivalent to a number average molecular weight, $M_n$, of about 22,058, as determined by osmotic pressure measurements.

The term "intrinsic viscosity" as used herein is given by the formula $$[\eta] = \lim_{C \to 0} \eta_{sp}/C = \frac{(\eta - \eta_0)/\eta_0}{C} = \lim_{C \to 0} (\eta_{rel}-1)/C$$

where $\eta$ is the intrinsic viscosity of the polymer, $\eta_o$ is the intrinsic viscosity of the solvent, $\eta_{sp}$ is the specific viscosity, C is concentration, $\eta_{sp}/C$ and $(\eta_{rel}-1)/C$ are symbols for the reduced specific viscosity. The definition of intrinsic viscosity as used herein is found in the treatise "Principles of Polymer Chemistry" by P. J. Flory. The intrinsic viscosity as used herein is obtained by plotting obtained values of $\eta_{sp}/C$ for the polyester of this invention in 1:1 phenol/tetrachloroethane at 25° C. at different dilute concentrations and then extrapolating the $\eta_{sp}/C$ intercept to zero concentration on a plot of concentration versus inherent $\eta_{sp}/C$. The reduced specific viscosity values are measured using a conventional viscometer apparatus.

The intrinsic viscosity of the polyester of this invention is at least 0.85 deciliter/gram as measured in 1:1 phenol/tetrachloroethane at 25° C., and preferably about 0.9 to 1.5 deciliters/gram. In general, shaped articles made from the polyester of this invention having higher intrinsic viscosity have correspondingly higher impact strength.

It is an advantage of the polyester of this invention over the polyester of the prior art that, because of its high intrinsic viscosity above 0.85 deciliter/gram, it can be shaped into articles having an impact strength of at least about 2 ft.lbs./in. of notch as measured by ASTM D-256-56. Such high impact strength is desirable in materials employed in manufacturing shaped articles for use as safety glass and in housings for heavy machinery.

Another advantageous property of the polyester, which is also attendant with a high intrinsic viscosity, and corresponding high molecular weight, is a high glass transition temperature, $T_g$, of at least about 200° C., as measured by differential scanning calorimetry.

The terminal groups of the polyester of this invention may comprise groups such as carboxy, phenolic OH, alkyl carboxylic ester, and the like. The terminal groups present on the polyester obtained by the above-described polymerization process will be acid chloride and phenolic OH groups, which are the reactive functional groups of the starting materials. If desired, the terminal phenolic OH groups of the polyester as originally obtained may be "capped" or modified, by reacting them with reagents such as acid chlorides, e.g. acetyl chloride, benzoyl chloride and the like, to form terminal ester groups. Similarly, terminal acid chloride groups may be "capped" by reacting them with active hydrogen compounds, such as methanol, ethanol, aniline, ethylamine and the like. Purpose of capping the polyester with different moieties may be to improve its dispersibility in various media or to provide active sites for attachments of such groups as dyeing agents, flame retardants, ultraviolet absorbers and the like. The terminal groups may be chosen for various desired applications or purposes, with the proviso that the intrinsic viscosity of the obtained polyester containing such modified terminal groups remains at least 0.85 deciliter/gram.

If desired, the polyester of this invention may be compounded with inert solid materials for a number of purposes, such as coloration, reinforcement, stabilization, cost reduction and to improve its molding characteristics. Reinforcing materials which can be added to give greater mechanical strength for use in various applications, such as in reinforcing beams and structural components, include fiberglass, wollastonite, carbon fibers and mica flakes. A composition comprising the polyester of this invention and a reinforcing material is also a subject of this invention.

The present invention further provides molding compositions comprising the polyester of this invention together with suitable additives such as reinforcing materials, flame retardants, ultraviolet absorbers, stabilizers and inert fillers. Typically, such molding compositions can be used in injection molding, compression molding and blow molding processes to produce articles having high impact strength.

The polyester of this invention can be made by the process comprising the steps of adding a solution of 4,4'-benzophenonedicarboxylic acid halide in an inert, water-immiscible organic solvent to a basic aqueous solution of a salt of 2,2-(4'-hydroxyphenyl)propane to form a two-phase liquid mixture, to form and precipitate the polyester, and recovering the precipitated polyester.

The type of process employed for making the invention polyester is known as "interfacial condensation polymerization". Polyesters obtained by interfacial condensation polymerization generally have higher molecular weights than polyesters obtained by other methods, such as melt polymerization. It has long been thought that this is particularly so if the polyester, as formed, is dissolved in the organic phase. We now have surprisingly found that the polyester obtained by interfacial condensation polymerization of 4,4'-benzophenonedicarboxylic acid chloride with bisphenol A has higher molecular weight if it is not so dissolved, but instead is permitted to precipitate as it is being formed.

This is in direct contrast to the procedure described in U.S. Pat. No. 3,028,364, above discussed, which requires that special precautions are taken to avoid precipitation of the polyester during formation, either by adding a large volume of the water-immiscible organic solvent to the aqueous solution of 2,2-(4'-hydroxyphenol)propane salt prior to the addition of the solution of diacid chloride, or by conducting the addition of the reactants in reverse order by adding the aqueous phase to the organic phase, so that there is always a large excess of the organic solvent present during the polymerization. It is believed that, for that reason, the corresponding polyester described by Conix et al. supra, which is made by a process wherein it dissolves in the organic solvent of the two-phase liquid system, inherently does not possess an intrinsic viscosity higher than about 0.72 deciliter/gram as measured in 1:1 phenol/tetrachloroethane at 25° C. Shaped articles made from that prior art polyester generally exhibit impact strengths less than 1 ft.lb./in. of notch as determined by ASTM D-256-56. The reason why the polyester made by the process of this invention, which precipitates as it is being formed, has higher intrinsic viscosity than the corresponding polyester of the prior art, which is dissolved in the organic phase of the liquid reaction medium as it is being formed, is not known and is surprising in view of the fact that other aromatic polyesters give contrary results.

The 4,4'-benzophenonedicarboxylic acid halides, also referred to herein as diacid halides, useful in this invention include the fluoride, chloride, bromide and iodide, the chloride being preferred. It is also desirable to use a 4,4'-benzophenonedicarboxylic acid halide which is relatively free of impurities. Impurities which may be contained in the diacid halide can be conveniently removed by conventional techniques, such as by recrystallizing it from a suitable solvent such as benzene, toluene, chlorobenzene and the like, or by distillation. An impurity which is usually present is 4,4'-benzophenonedicarboxylic acid. It has been found that if significant amounts of 4,4'-benzophenonedicarboxylic acid are carried into the polyester, the polyester will have higher glass transition temperatures and slightly higher intrinsic viscosities, but shaped articles made from such polyester will not exhibit impact strengths of at least 2 ft.lbs./in. of notch as measured by ASTM D-256-56.

Organic solvents suitable for making the diacid halide solution for use in the invention process include aromatic and aliphatic hydrocarbons which are water-immiscible, inert under the reaction conditions, and are in the liquid state at ambient temperature. Preferably, they contain 1 to 10 carbon atoms. They may contain 1 to 4 halogen atoms, such as fluorine, chlorine, bromine and iodine, chlorine being preferred. By the term "water-immiscible" is meant that not more than about 2 weight percent of water is soluble in the organic solvent under the reaction conditions. The term "aromatic hydrocarbons" includes carbocyclic hydrocarbons containing a benzene or naphthalene ring system. The term "aliphatic hydrocarbon" includes linear, branched, chain and cyclic paraffins, as well as olefinic hydrocarbons. Both, aromatic and aliphatic hydrocarbons, may contain substituents including lower alkyl, nitro and lower alkoxy substituents, wherein the substituted aromatic and aliphatic hydrocarbons are inert under the reaction conditions. Representative examples of solvents that may be used include dichloromethane, chloroethane, 1,1-dichloroethane, 1,2-dichloroethane, tetrachloroethane, chloroform, carbon tetrachloride, 1,4-dichlorobutane, 2,2-dichloropropane, 1,2-difluoroethane, 1,2-dibromoethane, tetrachloroethylene, trichloroethylene, benzene, toluene, 1-chloronaphthalene, iodobenzene, anisole, cyclohexyl chloride, monochlorobenzene, orthodichlorobenzene, nitro-benzene, and mixtures thereof. It is preferred to use halogenated aliphatic hydrocarbons, especially linear saturated halogenated hydrocarbons containing 1 to 6 carbon atoms and 1 to 4 chlorine atoms. It is particularly preferred to use dichloroethane as the solvent for the diacid halide.

If desired, a co-solvent may be used in conjunction with the above-described organic solvent for the diacid halide, which is miscible with the solvent used for the diacid halide, but which is a non-solvent for the resulting polyester. Use of such co-solvent is indicated in instances when faster and/or more complete precipitation of the forming polyester is desired, particularly when the primary solvent is one in which the polyester is highly soluble. The amount of such a co-solvent, if employed, is generally about 1 to 10 percent by weight of organic solvent used for the diacid halide. Exemplary co-solvents include linear and branched saturated aliphatic ketones and monohydric alcohols containing from 1 to about 12 carbon atoms. Representative examples of suitable co-solvents include acetone, methanol, ethanol and methyl ethyl ketone. It is preferred to use acetone as a co-solvent.

The diacid halide is preferably employed in a molar ratio of diacid halide to 2,2-bis(4'-hydroxyphenyl)propane, or its metallic or ammonium salt, in the range of from about 0.75:1 to about 2:1, the preferred range being from about 1:1 to about 1.05:1.

The concentration of the diacid halide in the organic solvent is not critical. About 4 to about 25 parts by weight of solvent per part of diacid halide may suitably be employed, preferred concentrations ranging from about 10 to about 20 parts by weight of solvent per part of diacid halide.

The basic aqueous solution of the 2,2-(4'-hydroxyphenyl)-propane salt may additionally contain other organic solvents which are water-miscible and substantially inert under the reaction conditions, to aid in solubilizing a partially soluble salt of 2,2-(4'-hydroxyphenyl)propane. Representative examples include ethylene glycol, acetone and methanol in amounts not exceeding about 5 to 15 percent of the combined weight of the water and water-miscible solvent.

The concentration of 2,2-bis(4'-hydroxy-phenyl)propane salt in the basic aqueous solution is not critical. About 30 to about 50 parts by weight of water per part of 2,2-bis(4'-hydroxyphenyl)propane salt may suitably be employed, preferred concentrations ranging from about 35 to about 40 parts by weight of water per part of 2,2-bis(4'-hydroxyphenyl)propane salt. However, these concentrations are not critical and higher or lower concentrations may effectively be employed.

As starting material, the 2,2-bis(4'-hydroxyphenyl)propane can be supplied in the free phenolic form or in the form of its salts, that is to say its metallic and ammonium salts. However, in the polymerization, it is employed in the form of a basic aqueous solution. Such solution may be obtained by dissolving the free 2,2-bis(4'-hydroxyphenyl)propane in an aqueous medium containing excess base, or by dissolving the salts in aqueous base, or in water, followed by addition of base. A preferred procedure is to dissolve the free 2,2-bis(4'-hydroxyphenyl)propane in an aqueous solution of sodium hydroxide, potassium hydroxide or ammonium hydroxide, to obtain an aqueous solution of the corresponding salt. However, the salt can be pre-formed and then added to the aqueous medium. When using a salt form, it is preferred in a form which will be soluble in the aqueous basic medium, such as the ammonium, sodium or potassium salt. If a metallic salt is employed which is only partially soluble, such as the barium or calcium salt, a dispersion of the metallic salt is formed in which the solubility of the salt can be increased by suitable addition of a water-miscible organic solvent, which is a non-solvent for the polyester, such as ethylene glycol. However, it is preferred to use a metallic salt of 2,2-bis(4'-hydroxyphenyl)propane which is soluble in the aqueous basic medium. Metallic salts of 2,2-bis(4'-hydroxyphenyl)propane which are useful include the alkali metal or alkaline earth metal salts, e.g. lithium, sodium, potassium, rubidium, beryllium, magnesium, calcium, strontium and barium salts being representative examples. It is preferred to use a salt selected from the group consisting of sodium, potassium, magnesium, calcium, barium and strontium salts. The sodium salt is particularly preferred.

The basic aqueous solution may be made basic by the addition of a water soluble basic reagent capable of acting as proton acceptor in aqueous media. Suitable basic reagents include inorganic compounds which, when dissolved in water, form a basic solution and organic amine compounds. Suitable organic amine compounds include those containing 1 to 20 carbon atoms and at least one primary, secondary or tertiary amino group, especially those wherein the secondary and tertiary amino groups are substituted with alkyl groups containing 1 to 18 carbon atoms. The alkyl groups on the nitrogen may be linear or branched chain, and they may also contain other substituents which do not adversely affect the polymerization reaction including halogen, hydroxy and lower alkoxy groups. Included are aromatic amines containing from 6 to 12 carbon atoms and at least one primary, secondary or tertiary amino group, wherein the secondary and tertiary amino groups are preferably substituted with linear or branched alkyl groups containing 1 to 18 carbon atoms, and wherein the aromatic rings may be also substituted with other substituents which do not adversely affect the polymerization reaction, e.g. hydroxy, lower alkyl, and lower alkoxy groups. Further included are heterocyclic amines containing 5 to 10 carbon atoms and at least one of N, O or S, within the ring system, which ring system may further be substituted by substituents which do not adversely affect the polymerization reaction including lower alkyl, hydroxyl and lower alkoxy groups. Exemplary classes of inorganic basic reagents include the hydroxides, carbonates and bicarbonates of the alkali metals and alkaline earth metals, as well as, ammonium hydroxide. Exemplary classes of organic basic reagents include the saturated aliphatic amines, aromatic amines and heterocyclic nitrogen compounds. Specific examples of representative inorganic basic reagents include lithium hydroxide, sodium hydroxide, potassium hydroxide calcium hydroxide, strontium hydroxide, barium hydroxide, sodium carbonate, potassium carbonate, hydrated magnesium carbonate, calcium carbonate hexahydrate, sodium bicarbonate, potassium bicarbonate, and the like. Specific examples of representative organic reagents include dimethylaniline, pyridine, diamine, tributylamine, ammonium hydroxide and the like.

The basic reagent must be water soluble and must be able to combine with any by-product acid produced during the course of the polymerization. The basic reagent may be used to form the salt of the 2,2-bis(4'-hydroxyphenyl)propane, as discussed, supra. Preferred basic reagents are sodium hydroxide, potassium hydroxide and ammonium hydroxide, sodium hydroxide being particularly preferred.

When the free 2,2-(4'-hydroxyphenyl)propane is employed as starting material, then the basic reagent should be employed in excess of the amount required to convert all of the 2,2-(4'-hydroxyphenyl)propane into the salt form, and sufficiently provide a pH value above 7.0 for the basic aqueous solution. Conversely, when the 2,2-(4'-hydroxyphenyl)propane is used in the form of a salt, then only a small amount of basic reagent is required sufficient to provide a pH above 7.0 for the basic aqueous solution. Generally, the molar ratio of basic reagent to 2,2-bis(4'-hydroxyphenyl)propane is about 1.8:1 to 2.5:1 where the basic reagent is a monobasic reagent such as sodium hydroxide or pyridine, yielding the salt form and a pH value of about 7.1 to 13.8, and it is preferred to use a molar ratio of about 2:1 yielding the salt form and a pH value of about 7.1 to 13. If the basic reagent is a dibasic reagent, such as sodium carbonate or ethylene diamine, then half of the above mole ratios are used for the basic reagent.

Since the basic reagent is reacted with acid during the course of the reaction, the concentration of basic reagent, and thus, the pH of the aqueous medium is subsequently lowered from a pH value of about 13 to about 7.1–8.9. However, it may be desirable to conduct the reaction at a relatively constant pH value of about 7.1–8.9, in order to avoid hydrolysis of the acid halide or oxidation of the salt of 2,2-(4'-hydroxyphenyl)propane. This may be accomplished by using sufficient basic reagent initially to obtain a pH value of 7.1–8.9, and then continuously adding sufficient basic reagent during the course of the reaction to maintain a pH value of 7.1–8.9 of the aqueous medium.

If desired, a surfactant may be added to either one or both of the liquid phases, preferably to the basic aqueous solution, in order to promote efficient dispersion of the liquid phases to increase the interfacial area at which the polymerization reaction takes place. The surfactant may be employed in the amount of about 0.1 to 5 weight percent, based on the weight of 2,2-bis(4'-hydroxyphenyl)propane.

Suitable surfactants include those which are water soluble, such as tetraalkylammonium halide salts containing 3 to 25 carbon atoms and at least 1 quarternary nitrogen atom, e.g. tetraethylammonium chloride, tetrapropylammonium bromide, tetrabutylammonium chloride, tetraoctylammonium chloride, dodecyltriethylammonium bromide and the like. It is preferred to use tetraethylammonium chloride.

The solution of 4,4'-benzophenonedicarboxylic acid halide is added to the basic aqueous solution of the 2,2-bis(4'-hydroxyphenyl)propane salt. It has been found that this mode of addition yields polyester having a higher intrinsic viscosity than that obtained by the reverse procedure of adding the basic aqueous solution to the organic solution. This is believed to be so because the polyester readily precipitates out of the liquid mixture during the addition under the former procedure, whereas it tends to dissolve in the organic phase when the latter procedure is employed. It is, of course, possible to add both the organic as well as the aqueous solutions simultaneously to a mixing vessel such that the polyester forms and precipitates during the addition.

The polymerization is generally conducted at temperatures below about 30° C. Temperatures substantially above 30° C. tend to lead to polyesters having intrinsic viscosities lower than about 0.85 deciliter/gram. Preferably, the reaction is conducted at a temperature below about 15° C. and, more preferably, at a temperature below about 10° C. Temperatures lower than 0° C. are suitable, provided that neither of the liquid phases solidifies due to freezing. It is preferred to have both solutions at about equal temperature.

The rate of addition must be sufficiently high to effect precipitation of the polyester during the addition as it is being formed. In general, higher reaction temperatures require faster rates of addition. In general, faster rates of addition lead to precipitated polyester having higher intrinsic viscosities.

The addition of the organic solution to the basic aqueous solution is preferably conducted in an inert atmosphere, suitably under a nitrogen or $CO_2$ blanket, to avoid oxidation of 2,2-bis(4'-hydroxyphenyl)propane with resultant formation of undesired quinone-type products. However, the addition can also be performed in the open atmosphere, in which event an antioxidant, such as sodium dithionite or sodium hyposulfite is desirably added to the basic aqueous solution in an amount of about 0.001 to about 0.10 part by weight per part of 2,2-bis(4'-hydroxyphenyl)propane.

The precipitated polyester product can be recovered by conventional techniques such as sedimentation, filtration, centrifugation and the like, filtration being preferred.

The polyester of this invention can be formed by conventional techniques, such as melt extrusion and compression molding at temperatures of about 250° to 300° C. to obtain shaped articles having impact strength of at least 2 ft. lbs./in., as determined by ASTM D-256-56. Such an article is also a subject of this invention.

Shaped articles made from the polymer of this invention exhibit high heat deflection temperature. The heat deflection temperature is measured according to ASTM D-648-56 and represents the temperature at which the shaped article begins to flex under an established load. Higher heat deflection temperatures are a desirable property in polyesters because they permit use of use of such polyesters in high temperature applications. It is desirable to have shaped articles having high heat deflection temperatures, of at least about 180° C., and preferably of at least about 200° C., from a safety and usage standpoint in various applications, such as in high temperature safety glass and in housing units for industrial machinery and equipment.

The following examples are not to be construed as being limitations on the scope and spirit of the instant invention. Parts are by weight unless otherwise indicated.

EXAMPLE 1

This example illustrates how polyester of the present invention having high intrinsic viscosity is obtained by interfacial polymerization involving adding an organic solution of the diacid chloride to a basic aqueous solution of bisphenol A under conditions which permit the polyester to precipitate during formation. No organic solvent was present in the aqueous solution prior to the addition.

Sodium hydroxide, 5.60 parts, and 2,2-bis(4'-hydroxyphenyl)propane, 15.98 parts, were dissolved in 420 parts of water under a nitrogen atmosphere to prevent air oxidation of 2,2-bis-(4'-hydroxyphenyl)propane in solution. The solution was filtered and cooled to 0° C. Twenty-two and 57/100 parts of 4.4'-benzophenonedicarboxylic acid chloride (including a 5% by weight excess), were dissolved in 263 parts of dichloroethane. The solution was filtered to remove 4,4'-benzophenonedicarboxylic acid impurities, and cooled to 0° C. Tetraethylammonium chloride, 10.5 parts, was dissolved in 40 parts of water, then filtered and cooled to 0° C. The tetraethylammonium chloride solution was added with slow stirring to the aqueous alkaline solution of 2,2-bis(4'-hydroxyphenyl)propane. The stirring speed was increased and the dichloroethane solution of 4,4'-benzophenonedicarboxylic acid chloride was added rapidly (within 1 minute) to the 2,2-bis(4'-hydroxyphenyl)propane mixture. The resulting polyester precipitated out of solution and the stirring was continued for about 10 to 15 minutes. The suspension was filtered and the resulting polyester washed twice with 1600 parts of acetone, followed by 2000 parts of hot water and again twice with 1000 parts of acetone, and then dried under vacuum at 120° C. The intrinsic viscosity of the polyester as measured in 1:1 phenol/tetrachloroethane at 25° C. was 0.97 deciliter/gram. The glass transition temperature of the polyester as measured by differential scanning calorimetry was 208° C., and the heat deflection temperature as measured by ASTM D-648 was 132° C. at 264 psi. The dichloroethane layer after filtering was treated with methanol and no polyester was recovered.

Comparative Test 1

This comparative test illustrates how polyester of general composition as that obtained in Example 1, but having substantially lower intrinsic viscosity is obtained by interfacial polymerization in accordance with the prior art involving slowly adding a solution of bisphenol A in aqueous sodium hydroxide to a stirred solution of diacid chloride in dichloroethane, under which conditions the polyester does not precipitate as it is being formed, but instead dissolves in the organic phase and is recovered therefrom.

Sodium hydroxide, 5.60 parts, and 2,2-bis(4'-hydroxyphenyl)propane, 15.98 parts, were dissolved in 420 parts of water under a nitrogen atmosphere to prevent air oxidation of 2,2-bis-(4'-hydroxyphenyl)propane in solution. The solution was filtered and allowed to remain at room temperature, at 25° C. 4,4'-Benzophenonedicarboxylic acid chloride, 22.57 parts, (including a 5% excess), was dissolved in 263 parts of dichloroethane and the solution was filtered and allowed to remain at room temperature, 25° C. Tetraethylammonium chloride, 10.5 parts, was dissolved in 40 parts of water and was filtered and allowed to remain at room temperature, 25° C. The tetraethylammonium chloride solution was added to the aqueous alkaline solution of 2,2-bis(4'-hydroxyphenyl)propane with slow stirring and the resulting solution was added to the dichloroethane solution of 4,4'-benzophenonedicarboxylic acid chloride slowly over one-half hour with rapid stirring. No polyester precipitation occurred. The solution was stirred an additional 5 minutes after the addition was completed and no polyester precipitation was noted. The liquid mixture was poured into 1600 parts of acetone, whereupon the polyester was precipitated. The suspension was filtered and the separated polyester washed twice in 1000 parts of acetone, twice in 2000 parts of hot water and twice in 1600 parts of acetone, and then dried under vacuum at 120° C. The intrinsic viscosity of the polyester, as measured in 1:1 phenol/tetrachloroethane at 25° C., was 0.65 deciliter/gram. The glass transition temperature of the polyester was 200° C., and the heat deflection temperature as measured by ASTM D-648 was 110° C. at 264 psi.

EXAMPLE 2

A positive pressure type of compression mold was preheated to 280° C. The polyester from Example 1 was placed into the compression chamber of the mold and was subjected to a pressure of about 400 psi for about 10 minutes. The molded plaque was then allowed to cool to room temperature. The Izod impact test, ASTM-256-56, was performed on the plaque yielding a value of 5.3 ft.lbs./inch of notch.

Comparative Test 2

This Comparative Test shows the impact strength of a shaped article made from polyester having an intrinsic viscosity of 0.65 deciliters/gram as measured in 1:1 phenol/tetrachloroethane at 25° C.

The polyester from Comparative Test 1 was molded into a plaque using the procedure as described above in Example 2. The molded plaque had an Izod impact strength of 0.9 ft. lb./inch of notch, determined as described above. This illustrates that the polyester prepared by the procedure of Example 1, in which the polyester was precipitated as it was being formed, yielded a shaped article having a significantly higher impact strength as measured by ASTM D-256-56, as contrasted to the polyester of Comparative Test 1, which did not precipitate during the polymerization, but instead was permitted to dissolve in the organic phase to be subsequently recovered therefrom.

EXAMPLE 3

This Example illustrates the criticality of adding the organic solution of diacid halide to the aqueous solution such that the polyester of this invention substantially precipitates during formation to obtain intrinsic viscosity values above 0.85 deciliters/gram as measured under the conditions discussed above. Thirteen runs utilizing the procedure of Example 1 were conducted, except that the temperature during polyester formation and the rate of addition of the organic solution to the aqueous solution were varied. The faster addition was conducted by adding the organic solution rapidly over about a 3 minute period, and the slow condition was conducted by a continuous dropwise addition of the aqueous solution over about a 30-minute period.

The following Table summarizes the results of the runs including the temperature during polyester formation, the respective rate of addition, the intrinsic viscosity of the precipitated polyester and its glass transition temperature, Tg. An asterisk denotes that relatively impure diacid chloride was used; otherwise, diacid chloride recrystallized from toluene was employed. The symbol (s) denotes that the polyester was substantially dissolved during the course of the polymerization, and the properties listed in these instances are those of the small amount of polyester that actually did precipitate. In all other runs the polyester substantially precipitated during the reaction.

TABLE I

| Run | Temperature | Rate of Addition | Intrinsic Viscosity | $T_g$ | After molding Intrinsic Viscosity | $T_g$ |
|---|---|---|---|---|---|---|
| 1. | 0° | fast | 0.94 | 220* | insoluble | 200 |
| 2. | 0° | fast | 0.88 | 240* | insoluble | 208 |
| 3. | 0° | fast | 0.81 | 206 | 0.68 | — |
| 4. | 0° | fast | 0.88 | 209 | 0.98 | 193 |
| 5. | 0° | fast | 0.94 | 206 | 0.88 | — |
| 6. | 0° | fast | 1.09 | 217 | 0.76 | 185 |
| 7. | 25° | fast | 0.89 | 243* | insoluble | 212 |
| 8. | 25° | fast | 0.91 | 205 | 0.94 | 195 |
| 9. | 25° | fast | 0.97 | 208 | — | — |
| 10. | 0° | slow | 1.08 | 208 | 0.89 | 194 |
| 11. | 25° | slow | 0.50 | 191(s) | 0.53 | 184 |
| 12. | 25° | slow | 0.40 | 177(s) | 0.34 | 167 |
| 13. | 25° | slow | 0.25 | 157(s) | — | — |

The results indicate that addition of the solution of diacid chloride to the aqueous basic solution of 2,2-bis(4'-hydroxyphenyl)propane leads to formation of polyester having intrinsic viscosities of at least 0.85 deciliter/gram. Four exceptions are noted, including the last three runs, where the addition was made at 25° C. in a relatively slow manner. Here, intrinsic viscosities of at least 0.85 deciliter/gram were not obtained since the polyester did not substantially precipitate during the course of the reaction. The fourth run, performed at 0° C. with a fast addition, unexpectedly yielded a precipitated polyester having an intrinsic viscosity of 0.81. However, the average value of the intrinsic viscosity of other five runs performed at 0° C. under a fast addition was 0.95.

Comparative Test 3

This comparative test demonstrates that even by varying the temperature during polyester formation, as well as the rate of addition, the polyester does not substantially precipitate during polyester formation when the aqueous solution is added to the solution of diacid chloride, and that the dissolved polyester which is recovered from the organic solution has an intrinsic viscosity lower than 0.85 deciliters/gram.

Seven runs utilizing the general procedure of Comparative Test 1 were conducted in which the temperature during polyester formation and the rate of addition of the aqueous solution to the organic solution were varied. The rates of addition were the same as described in Example 3 for fast and slow addition and the other properties are the same as described in Example 3.

TABLE II

| Run | Temperature | Rate of Addition | Intrinsic Viscosity | $T_g$ | After molding Intrinsic Viscosity | $T_g$ |
|---|---|---|---|---|---|---|
| 1. | 0° | fast | 0.70 | 235* | insoluble | 223 |
| 2. | 25° | fast | 0.61 | 228* | insoluble | 219 |
| 3. | 0° | slow | 0.84 | 233* | insoluble | 214 |
| 4. | 25° | slow | 0.68 | 228* | insoluble | 202 |

TABLE II-continued

| Run | Temperature | Rate of Addition | Intrinsic Viscosity | $T_g$ | After molding Intrinsic Viscosity | $T_g$ |
|---|---|---|---|---|---|---|
| 5. | 25° | slow | 0.48 | 187 | 0.44 | 173 |
| 6. | 25° | slow | 0.64 | 205 | 0.73 | 192 |
| 7. | 25° | slow | 0.65 | 190 | — | — |

In all cases the intrinsic viscosity of the polyester obtained was below 0.85 deciliter/gram. Run No. 3 produced a polyester having intrinsic viscosity of 0.84 deciliter/gram. This run involved the use of impure diacid chloride, which tends to give slightly higher viscosity values of obtained polyester, but when the resulting polyester is subjected to molding, it becomes insoluble in the phenol/tetrachloroethane solvent used for the intrinsic viscosity determination. Polyester which is insoluble after molding is brittle and articles made therefrom have lower impact strength than are desired. The insolubility is though to be due to crosslinking of the polyester, during the molding process, a fact which is generally known to lead to embrittlement in polyesters.

We claim:

1. A thermoplastic polyester consisting essentially of recurring units of the formula:

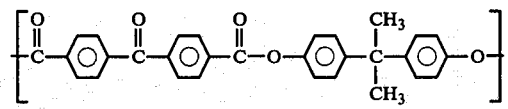

having an intrinsic viscosity of at least 0.85 deciliter/gram, as measured in 1:1 phenol/tetrachloroethane at 25° C.

2. The polyester of claim 1 wherein the polyester has an intrinsic viscosity of at least about 0.90 deciliter/gram.

3. The polyester of claim 1 further comprising a reinforcing filler.

4. A molding composition comprising the polyester of claim 1.

5. As an article of manufacture, a shaped article made from a thermoplastic polyester according to claim 1.

6. A process for preparing a thermoplastic polyester according to claim 1 which comprises the steps of (a) adding a solution of 4,4'-benzophenone dicarboxylic acid halide in an inert water-immiscible organic solvent, to a basic aqueous solution of a salt of 2,2-bis (4'-hydroxyphenyl) propane to form and precipitate the polyester during the addition, and (b) recovering the precipitated polyester wherein the molar ratio of 4,4'-benzophenone dicarboxylic acid halide to 2,2-bis (4'-hydroxyphenyl) propane salt is about 0.75:1 to 2:1, and the amount of organic solvent is about 4 to 25 parts by weight per part of 4,4'-benzophenone dicarboxylic acid halide and the process is conducted at a temperature below about 30° C.

7. The process of claim 6 wherein the organic solvent is selected from the group consisting of liquid halogenated aliphatic and aromatic hydrocarbons, having 1 to 10 carbon atoms and containing 1 to 4 halogen atoms, and mixtures thereof.

8. The process of claim 7 wherein the organic solvent is a saturated linear aliphatic hydrocarbon having 1 to 6 carbon atoms and containing 1 to 4 chlorine atoms.

9. The process of claim 8 wherein the solvent is dichloroethane.

10. The process of claim 7 wherein the organic solvent contains a co-solvent which is a nonsolvent for the polymer.

11. The process of claim 6 conducted at a temperature below about 15° C.

12. The process of claim 6 wherein the 4,4'-benzophenonedicarboxylic acid halide is 4,4'-benzophenonedicarboxylic acid chloride.

13. The process of claim 6 wherein the salt of 2,2-bis-(4'-hydroxyphenyl)propane is selected from the group consisting of ammonium, alkali metal and alkaline earth metal salts of 2,2-bis(4'-hydroxyphenyl)propane and mixtures thereof.

14. The process of claim 13 wherein the salt is selected from the group consisting of the sodium, potassium, magnesium, calcium, barium and strontium salts.

15. The process of claim 13 wherein the salt is the sodium salt.

16. The process of claim 6 wherein the basic aqueous solution further comprises a water-miscible inert organic solvent, which is a non-solvent for the polyester.

17. The process of claim 6 wherein the basic aqueous solution further comprises a tetraalkylammonium halide.

18. The process of claim 6 wherein the aqueous basic medium further comprises a water-soluble basic reagent.